United States Patent
Fiske et al.

(10) Patent No.: US 9,417,811 B2
(45) Date of Patent: Aug. 16, 2016

(54) EFFICIENT INLINE DATA DE-DUPLICATION ON A STORAGE SYSTEM

(75) Inventors: Rahul M. Fiske, Pune (IN); Subhojit Roy, Pune (IN); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1101 days.

(21) Appl. No.: 13/414,247

(22) Filed: Mar. 7, 2012

(65) Prior Publication Data

US 2013/0238876 A1   Sep. 12, 2013

(51) Int. Cl.
*G06F 12/00* (2006.01)
*G06F 3/06* (2006.01)
*G06F 12/08* (2016.01)

(52) U.S. Cl.
CPC .............. *G06F 3/0641* (2013.01); *G06F 3/067* (2013.01); *G06F 3/0608* (2013.01); *G06F 12/00* (2013.01); *G06F 12/0866* (2013.01); *G06F 2212/1024* (2013.01)

(58) Field of Classification Search
USPC ....................................................... 711/216
See application file for complete search history.

(56) References Cited

U.S. PATENT DOCUMENTS

| | | | |
|---|---|---|---|
| 7,814,149 B1 | 10/2010 | Stringham | |
| 8,620,886 B1* | 12/2013 | Madan et al. | 707/698 |
| 2009/0254609 A1 | 10/2009 | Wideman | |
| 2010/0188273 A1 | 7/2010 | He et al. | |
| 2010/0250896 A1 | 9/2010 | Matze | |
| 2010/0262797 A1 | 10/2010 | Rosikiewicz et al. | |
| 2010/0333116 A1 | 12/2010 | Prahlad et al. | |
| 2011/0029497 A1* | 2/2011 | Benhase et al. | 707/698 |
| 2011/0055174 A1 | 3/2011 | Popovski et al. | |
| 2011/0055471 A1 | 3/2011 | Thatcher et al. | |
| 2011/0113115 A1 | 5/2011 | Chang et al. | |
| 2011/0179341 A1* | 7/2011 | Falls et al. | 714/807 |
| 2012/0173558 A1* | 7/2012 | Sorenson, III | 707/758 |

FOREIGN PATENT DOCUMENTS

WO  WO2009033074 A2   3/2009
WO  WO2009134662 A2   11/2009

OTHER PUBLICATIONS

Debnath, Biplob et al., "FlashStore: High Throughput Persistent Key-Valuie Store", The 36th International Conferenc on Very large Data Bases, Proceedings of the VLDB Endowment, vol. 3, No. 2, Singapore, Sep. 13-17, 2010, pp. 1414-1425.
Geer, David , "Reducing the Storage Burden via Data Deduplication", IEEE Computer Society, Dec. 2008, pp. 11-13.
Meister, Dirk , "dedupv1: Improving Deduplication Throughput using Solid State Drives (SSD)", Paderborn Center for Parallel Computing, Technical Report, 2010, 28 pages.

* cited by examiner

*Primary Examiner* — Yong Choe
*Assistant Examiner* — Gautam Sain
(74) *Attorney, Agent, or Firm* — Stephen R. Tkacs; Stephen J. Walder, Jr.; Randall J. Bluestone (57) ABSTRACT

A mechanism is provided in a storage system for efficient inline data de-duplication. The mechanism receives a write command and a hash key for a portion of data to be written from an application host to a write address. The write command indicates whether the application host is tolerant or intolerant to data loss. Responsive to the write command indicating the application host is tolerant to data loss, the mechanism performs a hash key lookup in a hash index. The mechanism determines whether the portion of data has previously been written to the storage system. Responsive to determining the portion of data has previously been written to the storage system, the mechanism stores a pointer to the previously written data at the write address.

20 Claims, 10 Drawing Sheets

EFFICIENT INLINE DATA DE-DUPLICATION ON A STORAGE SYSTEM

BACKGROUND

The present application relates generally to an improved data processing apparatus and method and more specifically to mechanisms for enabling efficient inline data de-duplication on a storage system in an enterprise storage cloud.

Enterprise storage systems that perform inline data de-duplication perform three major tasks in the input/output (I/O) path that can potentially impact performance of that storage system. First, the storage system performs calculation of hash keys for data chunks for a given I/O. The hash keys serve as unique identities for a chunk of data. Usually, the storage system uses standard methods to calculate the hash key, e.g., message digest algorithm (MD5) checksum or secure hash algorithm (SHA1/SHA2) keys, etc.

Second, the storage system performs lookup of the hash key in the hash key index. This enables the data de-duplication system to determine whether the chunk of data that has just arrived matches with an existing chunk of data or whether it is a new chunk of data that must be written to the storage and its hash key inserted into the hash key index. If the chunk of data matches with an existing chunk of data, the storage system stores only a pointer to the previous data chunk.

The storage system also receives write data from the application server over the wire through small computer system interface (SCSI) or Fibre Channel even in the cases when identical data is already stored in the storage system.

SUMMARY

In one illustrative embodiment, a method, in a storage system, for efficient inline data de-duplication. The method comprises receiving, by the storage system, a write command and a hash key for a portion of data to be written from an application host to a write address. The write command indicates whether the application host is tolerant or intolerant to the rare possibility of data loss during de-duplication. The method further comprises performing, by the storage system, a hash key lookup in a hash index in response to the write command indicating the application host is tolerant to data loss. The method further comprises determining, by the storage system, whether the portion of data has previously been written to the storage system. The method further comprises storing, by the storage system, a pointer to the previously written data at the write address in response to the storage system determining the portion of data has previously been written to the storage system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for enabling efficient inline data de-duplication on a storage system in an enterprise storage cloud. A de-duplication storage system performs tasks that are resource- and time-consuming. These calculations have the potential to slow down an I/O operation, thus increasing its latency. Secondly, in a large enterprise storage system, the storage system must perform these activities for hundreds of thousands of I/O operations per second, thus limiting the scalability of the storage system in terms of performance. This also results in a need to add significant amounts of processor power to data de-duplication systems in order to perform the above calculations and lookups, thus causing the storage system to consume higher amounts of energy.

In current storage systems that provide data de-duplication, the storage system performs hash key calculation and lookup. In today's inline data de-duplication solutions, even for applications that can handle some data loss on very rare occasions, the applications transmit data over the wire, thus resulting in unnecessary bandwidth consumption even if the data is already stored in the storage system.

In accordance with the illustrative embodiments, a mechanism is provided to calculate hash keys for data chunks subsequently used for data de-duplication in a distributed fashion in order to reduce I/O latency, improve storage system scalability, and potentially reduce network traffic significantly. As a result of the significant decrease in resource consumption within storage systems, the illustrative embodiments can lead to greener storage solutions.

It is understood in advance that although this disclosure includes a detailed description on cloud computing and cloud storage, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
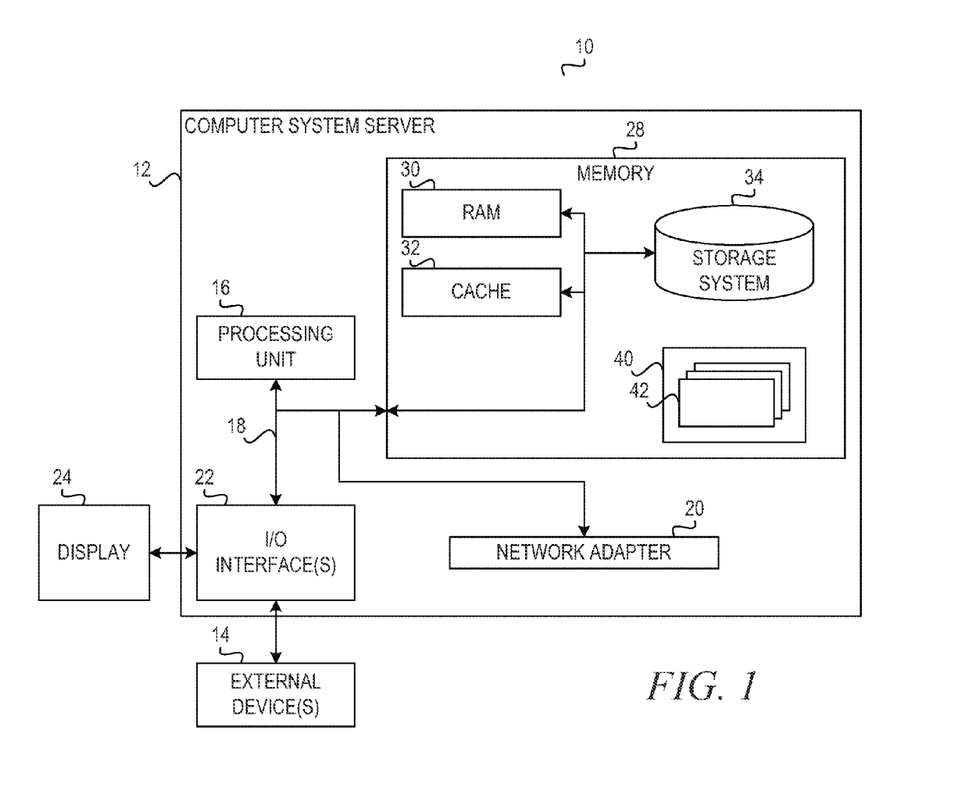
FIG. 1 depicts a cloud computing node according to an illustrative embodiment.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Computer system/server 12 may also communicate with one or more external devices 14 such as a keyboard, a pointing device, a display 24, etc.; one or more devices that enable a user to interact with computer system/server 12: and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
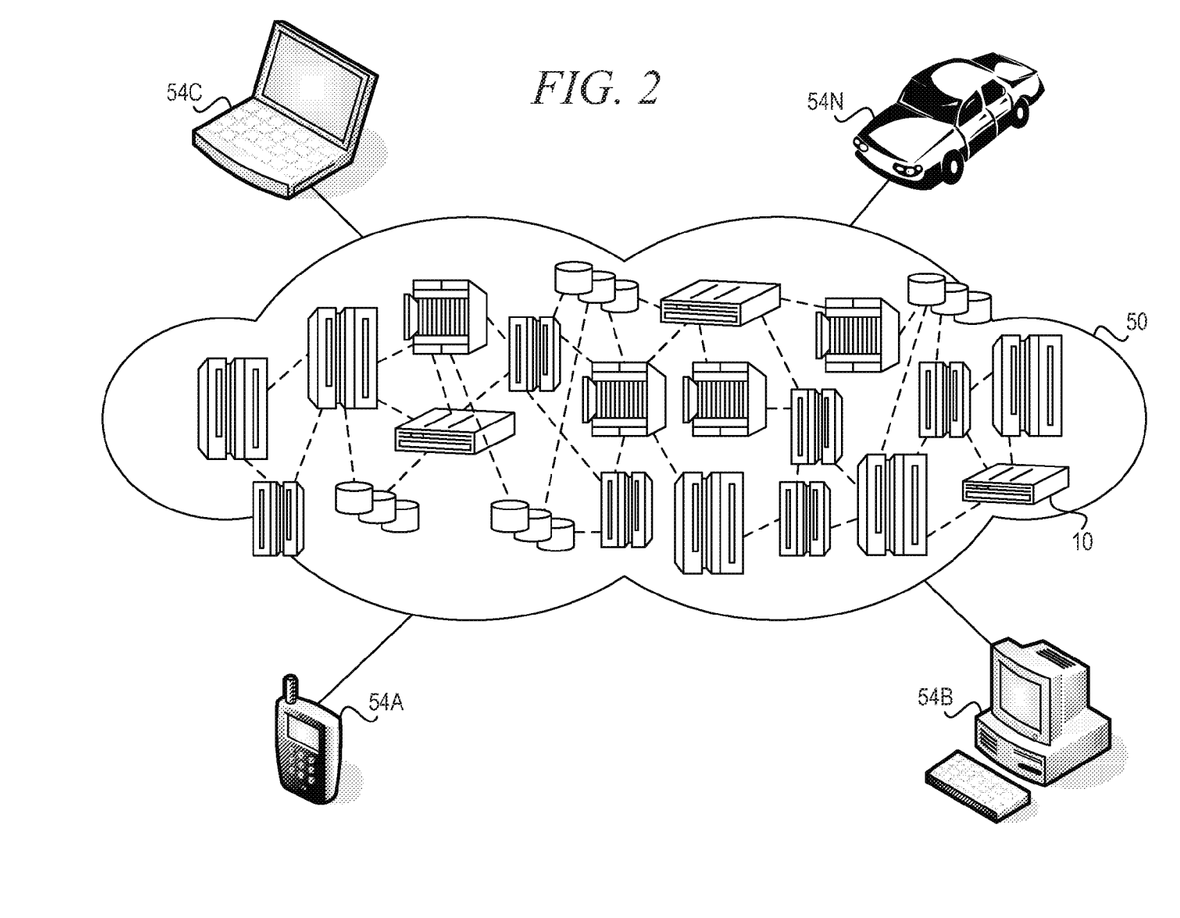
FIG. 2 depicts a cloud computing environment according an illustrative embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
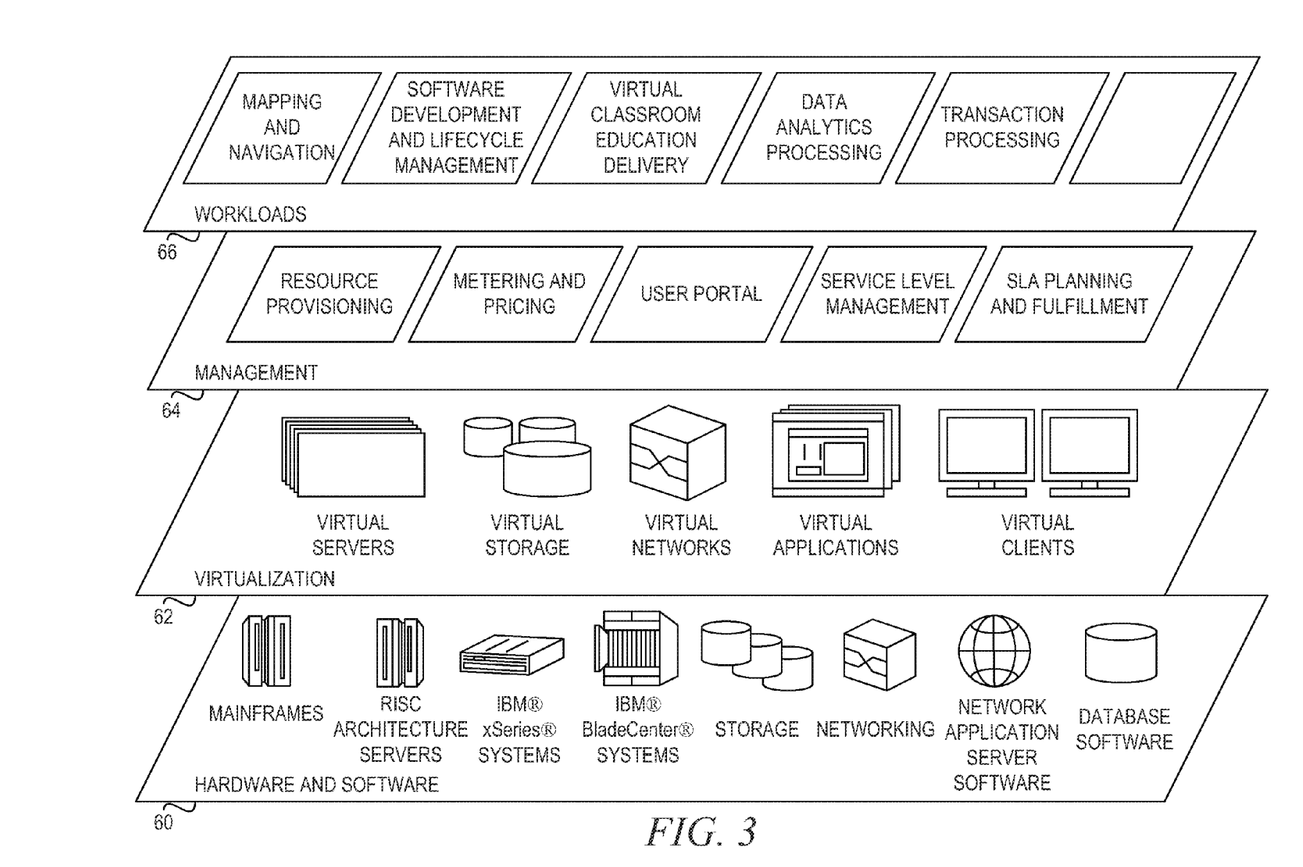
FIG. 3 depicts abstraction model layers according to an illustrative embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery data analytics processing; and transaction processing.

In accordance with an illustrative embodiment, an application host, such as computer system server 12 in FIG. 1, communicating with a storage system calculates hash keys, also referred to as checksums, for WRITE data and sends those hash keys to the storage system, such as storage in hardware and software layer 60 in FIG. 3, along with the data or without the data, as the case may be. The storage system uses the hash keys from the application host to lookup the hash key in a hash key table to look for matching data. The illustrative embodiments propose two enhanced write commands, an enhanced WRITE command and an enhanced WRITE with data command, to allow the application host to send hash keys with WRITE requests.

Initially, the host finds out the method for checksum/hash key calculation using a command, such as a SCSI INQUIRY or MODE SENSE command. The target storage system notifies the host about the mechanism used for key calculation, e.g., MD5, SHA1, SHA2, etc. The storage system also notifies the host about the "grain size" if it using a fixed size "grain" to calculate the hash keys and block alignment information for those grains. For example, for some arrays, the grain size is 4 kB. In case the target uses a variable grain size to calculate the hash key, the storage system returns that information to the host. The application host uses this information to calculate hash keys correctly and send them to the target storage system (with or without the data).

For applications that can tolerate an occasional data loss, the chances of which are very rare, the host calculates the hash keys for the application WRITE data and sends the keys along with an enhanced WRITE (EWRITE) command. Once the storage target receives the enhanced WRITE command, it does a lookup of the keys.

If the storage system finds a match on hash index (hash table) lookup, the storage system considers the data as "already stored" and stores a pointer to the already stored data at the logical block address (LBA) specified by the WRITE command. The storage system then sends a COMMAND COMPLETE STATUS to the host to indicate the data is already present on the storage device. Hence, the host need not send the data to the storage system over the wire.

If the storage system does not find a match on hash index lookup, the host must transfer the data to the storage device. The storage system then sends a transfer ready (XFER_RDY) status to indicate that data must be sent from the host. The storage system adds the new hash to the hash index table in association with the address of the WRITE.

In accordance with an example embodiment, the XFER_RDY is slightly modified to communicate the size of data the target is ready to accept and the starting point of the data considered to be either 0 or data-length of previous XFER_RDY+1. In this case, the starting point and size of data must be explicitly informed by the target to the host. This is because certain grains of data may already be found on the storage device while other grains of data may not be found. In order for the target to inform the host about those chunks that were not found, the {start address, length} tuple must be sent to the host.

Figure 4:
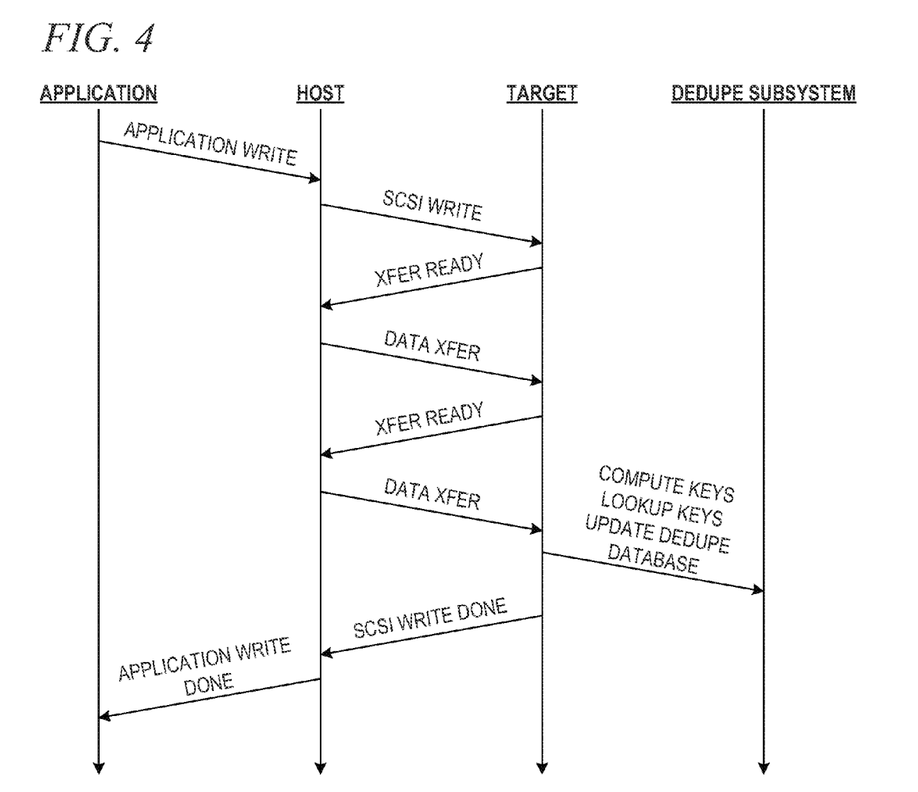
FIG. 4 represents data flow for a conventional approach in de-duplication systems where complete data is transferred to the storage system, which calculates the hash keys.

FIG. 4 represents data flow for a conventional approach in de-duplication systems where complete data is transferred to the storage system, which calculates the hash keys. This data flow depicts the case where hash key matches are not found in the de-duplication database. The application generates an application write. The host then sends a SCSI WRITE to the target storage system. The target sends an XFER_RDY to the host. In response to the XFER_RDY, the host transmits the data to the target storage system. The target sends a XFER_RDY and the host transmits the data (DATA XFER) until all data is transferred to the storage system. Then, the target storage system computes the hash keys and looks up the keys in the de-duplication database. The target then stores the data in the storage device and updates the de-duplication database. Then, the target storage system sends a SCSI WRITE DONE to the host, which sends an APPLICATION WRITE DONE to the application.

Figure 5:
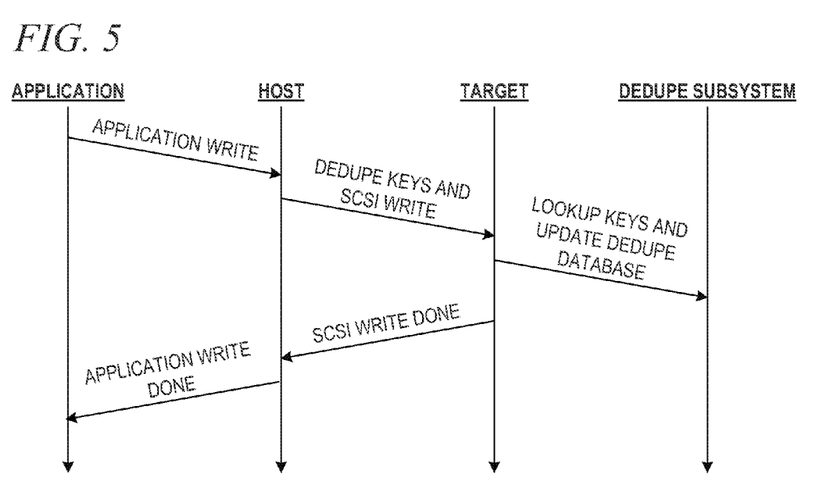
FIG. 5 represents a data flow diagram for efficient inline data de-duplication with in accordance with an illustrative embodiment.

FIG. 5 represents a data flow diagram for efficient inline data de-duplication with in accordance with an illustrative embodiment. The application generates an application write. The host calculates de-duplication keys and sends a SCSI WRITE with the de-duplication keys to the target storage system. The target looks up the keys and updates the de-duplication database. The target then sends a SCSI WRITE DONE to the host. The host then sends an APPLICATION WRITE DONE to the application. In the example shown in FIG. 5, all hash keys are found in the de-duplication database. The WRITE command completes without the host transferring any data to the storage system.

Figure 6:
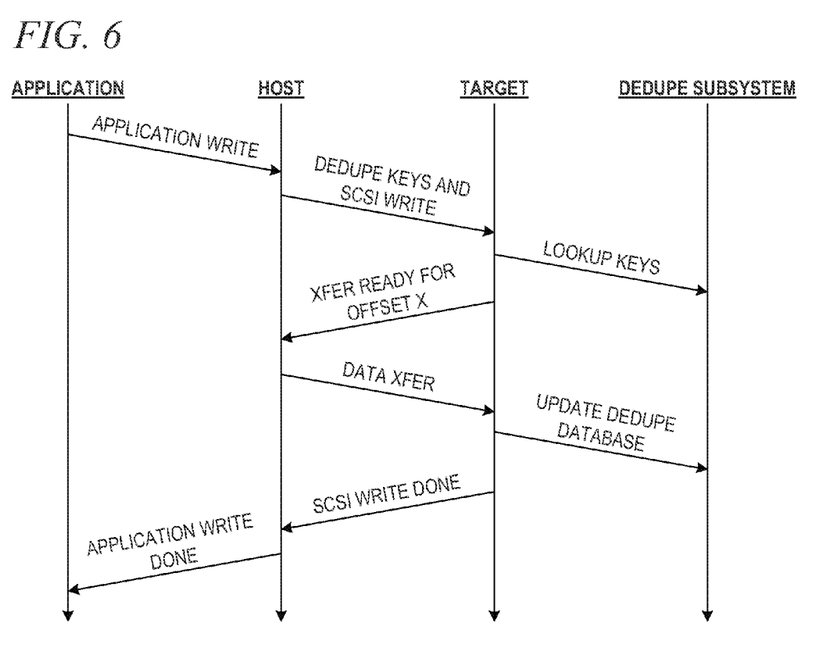
FIG. 6 represents a data flow diagram for situations where the storage system does not find some hash keys in accordance with an illustrative embodiment.

FIG. 6 represents a data flow diagram for situations where the storage system does not find some hash keys in accordance with an illustrative embodiment. The application generates an application write. The host calculates de-duplication keys and sends the de-duplication keys with a SCSI WRITE to the target storage system. The target looks up the keys. The target finds some of the keys in the de-duplication database and does not find the remaining keys in the de-duplication database. The target sends a XFER_RDY for the data not already stored in the storage system to the host. The host then sends the data to the target storage system. The target updates the de-duplication database for those data chunks being stored and with pointers for those data chunks already stored in the storage system. The target then sends SCSI WRITE DONE to the host. The host then sends an APPLICATION WRITE DONE to the application.

For applications that absolutely cannot tolerate any data loss, however minor the possibility may be, the host sends the WRITE command to the target. The host calculates the hash keys for the WRITE data and sends the keys along with the standard WRITE command. The format of the WRITE payload includes the number of hash keys, the size of each hash key followed by the WRITE data. This is to ensure the target can find the hash keys as part of the standard WRITE data. As described earlier, the above can be provided using an enhanced WRITE command as well. On receipt of the WRITE data, the target reads the hash keys and uses the hash keys for lookups and updates in the index to indicate any grains of data that were written to the storage. If a match is found, the storage controller performs a bit-by-bit comparison of the data before it decides whether to store the information on persistent storage. The advantage in this case is that, even if the data does not match, the computation of hash keys has been done by the client and those keys are available to the storage controller for use directly, thus saving the compute intensive hash key computation on the Storage Controller.

In accordance with one illustrative embodiment, the application decides whether the storage system is to request all write data. That is, if the application is intolerant to data loss, the application notifies the storage system to request all data for bit-by-bit comparison to ensure no false positives. The application can indicate this preference by setting a bit in a special SCSI write command, for example. On the other hand, if the storage system receives a write command in which the bit is not set, the storage system knows the application can tolerate some data loss. For example, applications storing video data may be able to tolerate some data loss.

Figure 7:
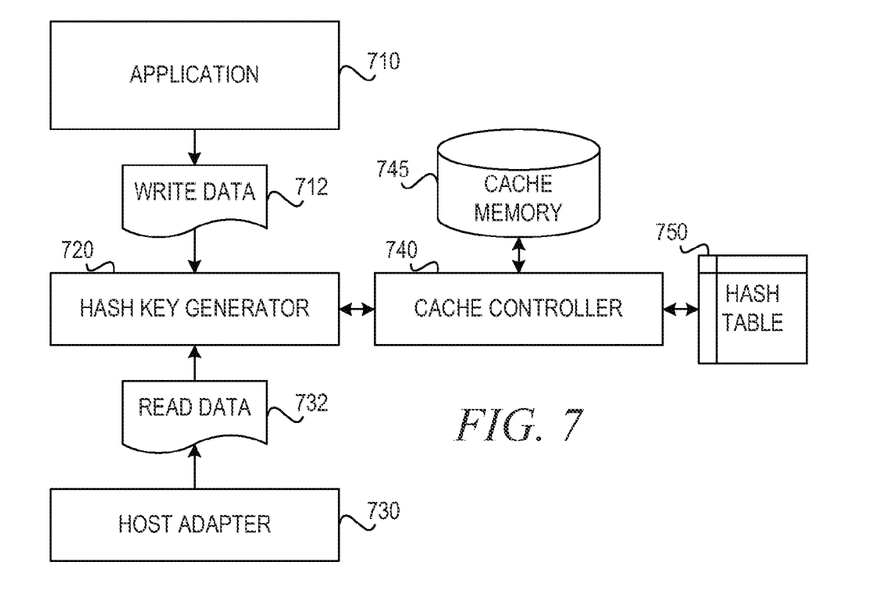
FIG. 7 is a block diagram illustrating a configuration for caching data chunks in a storage controller in accordance with an illustrative embodiment.

FIG. 7 is a block diagram illustrating a configuration for caching data chunks in a storage controller in accordance with an illustrative embodiment. An application 710 generates write data 712 for a write request. The host has a hash key generator 720 that generates hash keys to be sent to the storage system as described above. Cache controller 740 uses the hash keys generated by hash key generator 720 to tag cached data in cache memory 745. When cache controller 740 receives a new WRITE command, it uses the hash key for the new WHITE to determine whether the data already exists in cache memory 745 by looking up the hash key in hash table 750.

If the cache controller 740 determines the data already exists in cache memory 745, the cache controller 740 stores metadata that points to the same physical memory. That way, a lot of physical memory usage can be saved if, for example, multiple users are writing the same files. Thus, cache controller 740 uses de-duplication techniques to de-duplicate cache memory 745.

This embodiment also optimizes READ commands. If application 710 generates a READ command, and host adapter 730 receives read data 732 to complete the read command, hash key generator 720 generates hash keys for read data 732. If the hash key for any cache blocks match with the hash keys for the read data 732, cache controller responds to the application READ command from a single cached copy of the data, which may not belong to the virtual disk that this READ is directed to. Under normal circumstances, if identical READ data were cached for some other virtual disk, this would not be used to satisfy a READ request to a different virtual disk which actually contains identical data.

In another example embodiment, if a local hash key match if found, the host can perform a bit-by-bit comparison of the already cached data and determine whether the hash key match is not a false positive. Only in cases where the host finds a false positive, it issues a WRITE command to the common storage. Thus, client can use the cached data to detect false positives rather than sending the WRITE data to the storage controller for the storage controller to defect false positives.

Figure 8:
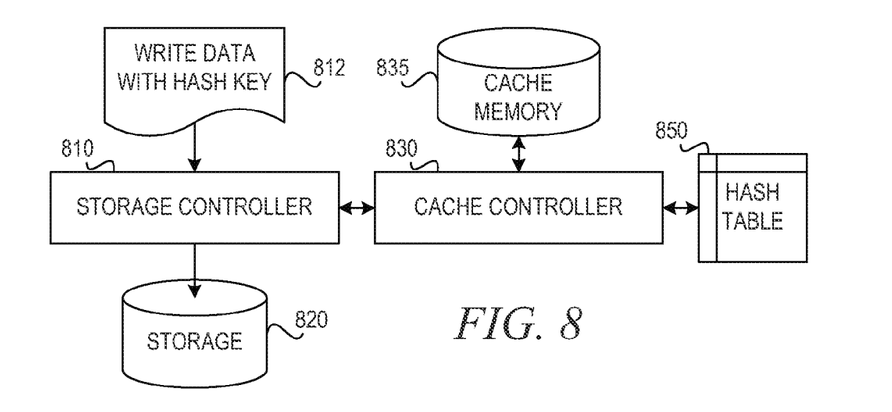
FIG. 8 is a block diagram illustrating configuration for caching data chunks in a storage system in accordance with an illustrative embodiment.

FIG. 8 is a block diagram illustrating configuration for caching data chunks in a storage system in accordance with an illustrative embodiment. Storage controller 810 receives write data with hash keys 812 from the host. Normally, storage controller 810 would first cache the WRITE command in cache memory 835 and respond to the host before storing the write data in storage 820 to minimize the latency of the WRITE command. In the case of data de-duplication, if hash keys are calculated by the storage controller before the data is cached, this would add significant latency to the WRITE response. Instead, if the host calculates the hash keys and sends them to the storage controller 810, the storage controller can match the keys with hash keys in hash table 850 for data in cache memory 835. Cache controller 830 can cache only those copies of data that do not have matching hash keys. This would significantly enhance cache utilization, because multiple copies of the same data are not stored in cache memory 835. This is achieved without adding any latency to the SCSI write command.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 9:
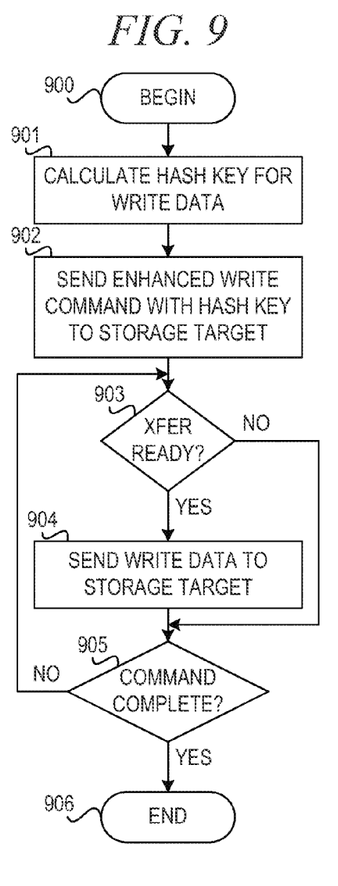
FIG. 9 is a flowchart illustrating operation of a host performing a write operation with efficient inline data de-duplication and data loss tolerance in accordance with an illustrative embodiment.

FIG. 9 is a flowchart illustrating operation of a host performing a write operation with efficient inline data de-duplication and data loss tolerance in accordance with an illustrative embodiment. Operation begins in block 900 in response to an application performing a write to a target storage system, and the host calculates one or more hash keys for the write data (block 901). The host sends an enhanced write command with the one or more hash keys to the storage target (block 902). Then, the host determines whether a transfer ready indication is received from the storage target (block 903). If the host receives a transfer ready indication from the storage target indicating write data to be transferred over the wire to the storage target, the host sends the write data to the storage target (block 904). In this way, the host only sends those chunks of data that do not have identical data chunks already stored in the storage target, as indicated by the storage target in the transfer ready indication.

Thereafter, or if this host does not receive a transfer ready indication from the storage target in block 903, the host determines whether a command complete status is received from the storage target (block 905). If the host does not receive a command complete indication, operation returns to block 903 to determine whether a transfer ready indication is received.

The host repeats blocks 903-905 until the host receives a command complete status from the storage target in block 905. Thereafter, operation ends in block 906.

Figure 10:
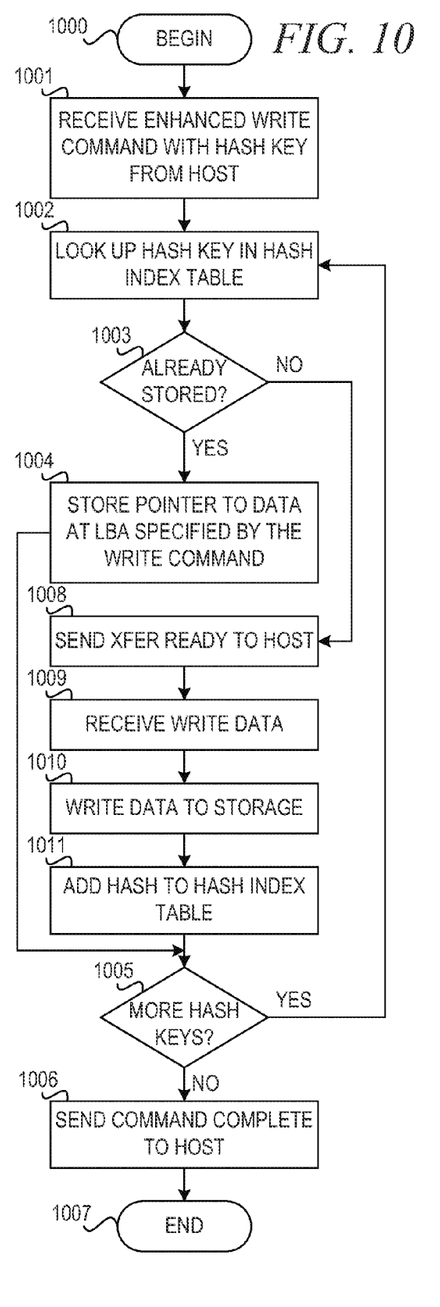
FIG. 10 is a flowchart illustrating operation of a storage system for efficient inline data de-duplication for applications that can endure rare occasions of data loss in accordance with an illustrative embodiment.

FIG. 10 is a flowchart illustrating operation of a storage system for efficient inline data de-duplication for applications that can endure rare occasions of data loss in accordance with an illustrative embodiment. Operation begins in block 1000, and the storage system receives an enhanced write command with a hash key (block 1001). For simplicity, the enhanced write command includes a single hash key for a single chunk of data; however, the flowchart applies for write commands having a plurality of hash keys for write data comprising a plurality of data chunks. The storage system looks up the hash key in a hash table index (block 1002). The storage system then determines whether the data chunk represented by the hash key is already stored in the storage system based on the hash key lookup (block 1003).

If the data chunk is already stored, the storage system stores a pointer to the already stored data at the logical block address (LBA) specified in the enhanced write command (block 1004). The storage system then determines whether there are more hash keys (block 1005). If there are more hash keys, operation returns to block 1002 to look up the hash key in the index table. If there are no more hash keys in block 1005, the storage system sends a command complete status to the host (block 1006), and operation ends in block 1007.

If the storage system determines the data chunk is not already stored in the storage system in block 1003, the storage system sends a transfer ready indication to the host (block 1008). The storage system receives write data from the host (block 1009) and writes the data to storage (block 1010). The storage system then adds the hash key to the hash index table for the chunk of data (block 1011). Thereafter, the storage system then determines whether there are more hash keys (block 1005). If there are more hash keys, operation returns to block 1002 to look up the hash key in the index table. If there are no more hash keys in block 1005, the storage system sends a command complete status to the host (block 1006), and operation ends in block 1007.

Figure 11:
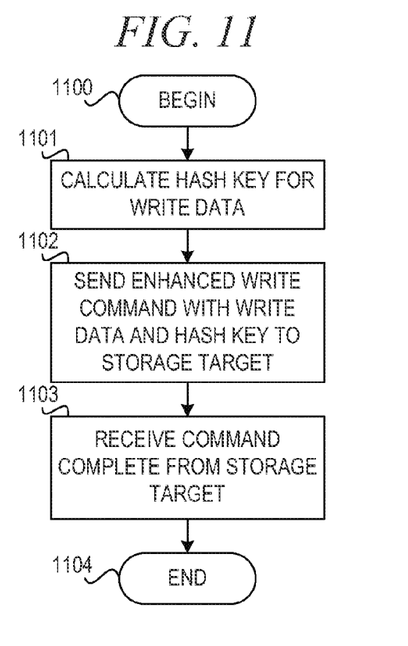
FIG. 11 is a flowchart illustrating operation of a host performing a write operation with efficient inline data de-duplication and data loss intolerance in accordance with an illustrative embodiment.

FIG. 11 is a flowchart illustrating operation of a host performing a write operation with efficient inline data de-duplication for applications with data loss intolerance in accordance with an illustrative embodiment. Operation begins in block 1100 in response to an application performing a write to a target storage system, and the host calculates one or more hash keys for the write data (block 1101). The host sends an enhanced write command with the write data and the one or more hash keys to the storage target (block 1102). Alternatively, the host may set a bit in the enhanced write command to indicate application requires a bit-by-bit comparison for matching hash keys and send the enhanced write command to the storage target, with or without the hash keys. Then, responsive to receiving a transfer ready indication from the storage target, the host may send the write data with the hash keys.

Responsive to the storage target receiving the write data, the host receives a command complete status from the storage target (block 1103). For the purpose of the performing the write operation, the host is done, and operation ends in block 1104.

Figure 12:
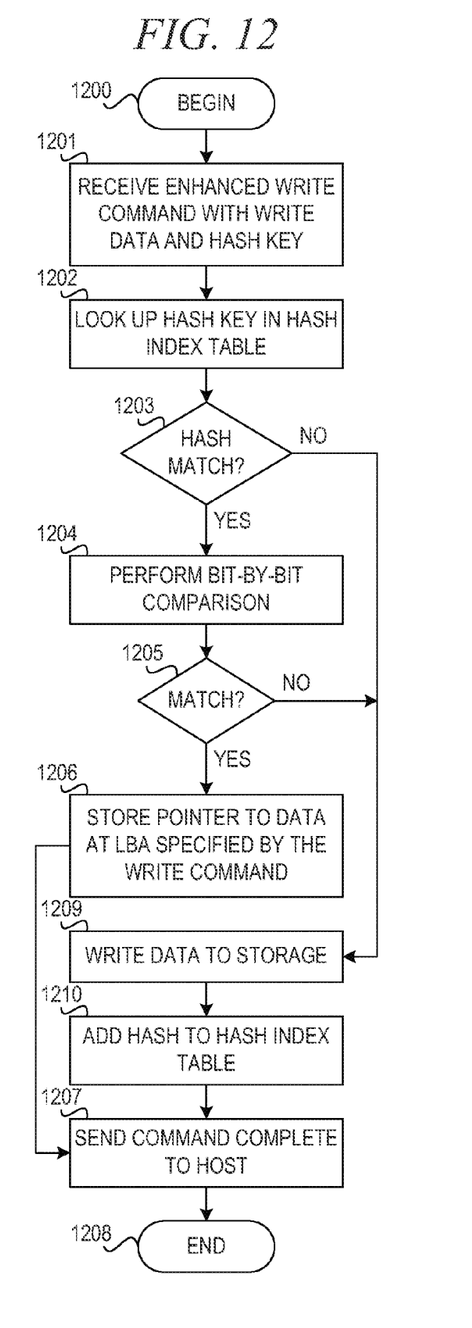
FIG. 12 is a flowchart illustrating operation of a storage system for efficient inline data de-duplication and data loss intolerance in accordance with an illustrative embodiment.

FIG. 12 is a flowchart illustrating operation of a storage system for efficient inline data de-duplication and data loss intolerance in accordance with an illustrative embodiment. Operation begins in block 1200, and the storage system receives an enhanced write command with write data and a hash key (block 1201). For simplicity, the enhanced write command includes a single hash key and the data transfer includes a single chunk of data; however, the flowchart applies for write commands having a plurality of hash keys for write data comprising a plurality of data chunks. The storage system looks up the hash key in a hash table index (block 1202). The storage system then determines whether the hash key matches a hash key for a data chunk already stored in the storage system (block 1203).

If the hash key lookup results in a match in block 1203, the storage system performs a bit-by-bit comparison of the write data stored in the storage system and the write data received from the host (block 1204). The storage system determines whether the bit-by-bit comparison results in a match (block 1205). If the bit-by-bit comparison results in a match, the storage system stores a pointer to the already stored data at the logical block address (LBA) specified in the enhanced write command (block 1206). Thereafter, the storage system sends a command complete status to the host (block 1207), and operation ends in block 1208.

If the hash key lookup does not result in a match in block 1203 or the bit-by-bit comparison does not result in a match in block 1205, the storage system writes the data to storage (block 1209). The storage system then adds the hash key to the hash index table for the chunk of data (block 1210). Thereafter, the storage system sends a command complete status to the host (block 1207), and operation ends in block 1208.

Figure 13:
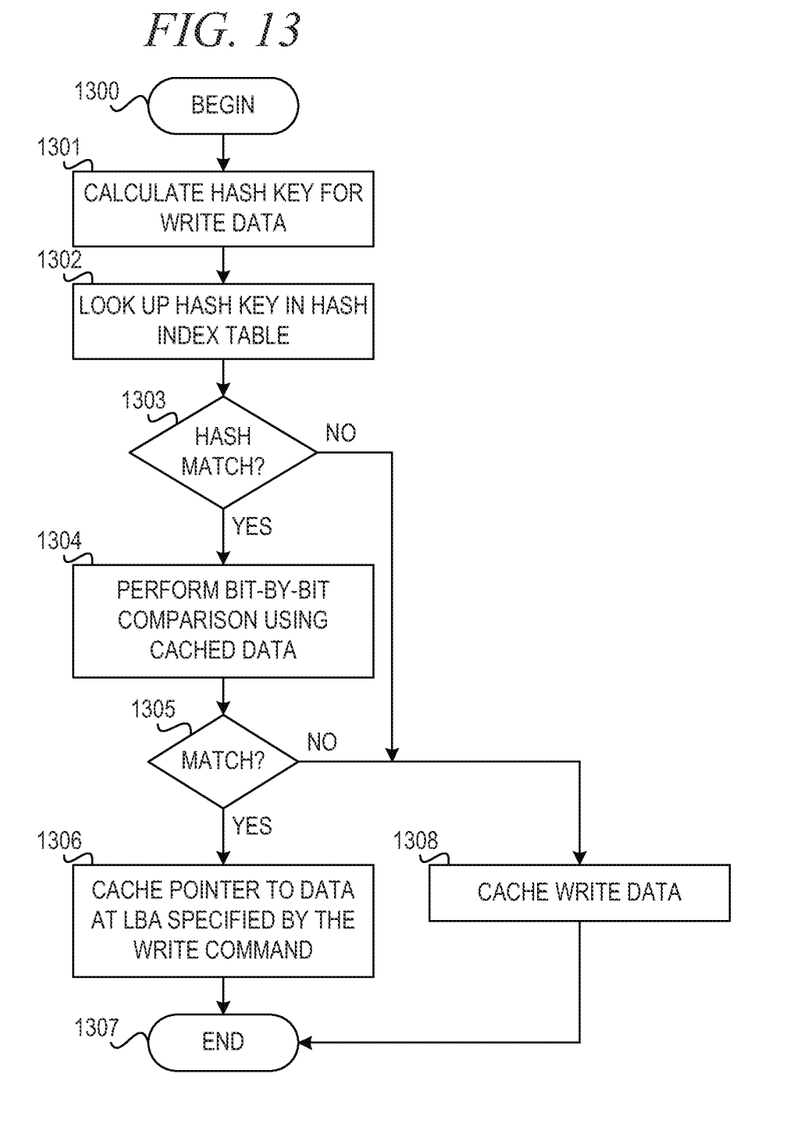
FIG. 13 is a flowchart illustrating of caching data chunks for a write in a host system or storage system with de-duplication in accordance with an illustrative embodiment.

FIG. 13 is a flowchart illustrating of caching data chunks for a write in a host system or storage system with de-duplication in accordance with an illustrative embodiment. Operation begins in block 1300 responsive to a write request, and the system calculates a hash key for a chunk of data within the write data (block 1301). The system then looks up the hash key in the hash index table (block 1302) and determines whether the hash key lookup results in a match (block 1303).

If the hash key lookup results in a match, the system performs a bit-by-hit comparison using the cached data and the write data (block 1304) and determines whether the bit-by-bit comparison results in a match (block 1305). If the bit-by-bit comparison results in a match, the system caches a pointer to the data at the address specified by the write command (block 1306). Then, if the system is a host system, the system sends an enhanced write command to the storage target with write data and hash keys. If the system is a storage system, the system may then write the data to the storage device. Thereafter, operation ends in block 1307.

If the hash key lookup does not result in a match in block 1303, or the bit-by-bit comparison does not result in a match in block 1305, the system caches the write data (block 1308). Then, if the system is a host system, the system sends an enhanced write command with hash keys to the storage system. If the system is a storage system, the system may then write the data to the storage device. Thereafter, operation ends in block 1307.

Figure 14:
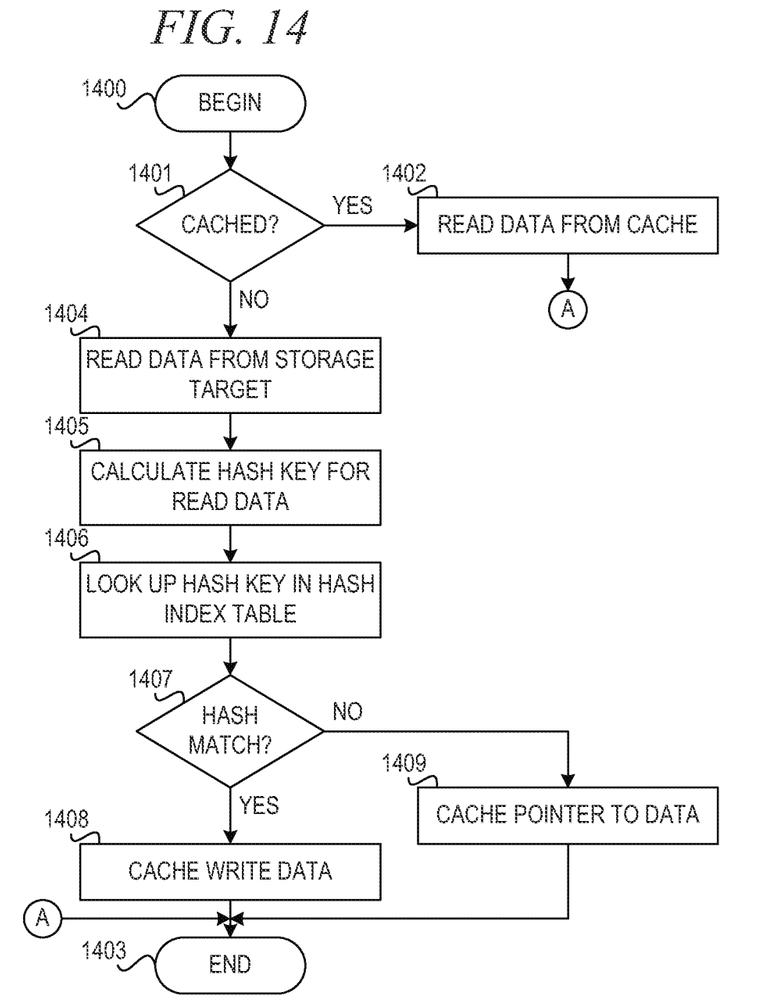
FIG. 14 is a flowchart illustrating operation of a host performing a read with data de-duplication in accordance with an illustrative embodiment.

FIG. 14 is a flowchart illustrating operation of a host performing a read with data de-duplication in accordance with an illustrative embodiment. Operation begins in block 1400 responsive to an application requesting a read from a target storage system, and the host determines whether the read data is cached (block 1401). If the read data is cached, the host reads the data from the cache (block 1402). Thereafter, operation ends in block 1403.

If the data is not cached, the host reads data from the target storage device (block 1404). The host then calculates a hash key for the read data (block 1405). For simplicity, the read involves a single hash key for a single chunk of data; however, the flowchart applies for reads involving a plurality of hash keys for read data comprising a plurality of data chunks. The host looks up the hash key in a hash index table (block 1406) and determines whether the hash key lookup results in a match (block 1407).

If the hash key lookup results in a match, the host caches the write data (block 1408), and operation ends in block 1403. If the hash key lookup does not result in a match, the host caches a pointer to the data (block 1409), and operation ends in block 1403.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for efficient inline data de-duplication on a storage system in an enterprise storage cloud. The illustrative embodiments eliminate the need to calculate hash keys on the storage platform completely, thus reducing its computation requirements and increasing its scalability. The illustrative embodiments eliminate hash key calculation in the data path inline, thus reducing I/O latency for inline data de-duplication devices. If data is not transmitted over the wire from the host to the storage in cases where hash key lookup results in a match, the illustrative embodiments result in significant savings in network bandwidth. This is especially useful and effective over slow and lossy links. The illustrative embodiments enhance the I/O performance of data de-duplication systems by ensuring the hash key generation need not be done on the storage system, thus ensuring hash key calculation does not become a performance bottleneck during heavy I/O workloads.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, winch includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a storage system, causes the storage system to:
    receive a write command and a hash key for a portion of data to be written from an application executing on a host system to a write address, wherein the write command indicates whether the application is tolerant or intolerant to data loss and wherein the hash key is calculated by the host system;
    responsive to the write command indicating the application is tolerant to data loss, perform a hash key lookup in a hash index;
    determine whether the portion of data has previously been written to the storage system; and
    responsive to the storage system determining the portion of data has previously been written to the storage system, store a pointer to the previously written data at the write address.

2. The computer program product of claim 1, wherein the computer readable program further causes the storage system to;
    responsive to the storage system determining the portion of data has not previously been written to the storage system, send a transfer ready indicator to the host system;
    receive the portion of data to be written;
    write the portion of data to the storage system; and
    update the hash index with the hash key.

3. The computer program product of claim 1, wherein the computer readable program further causes the storage system to:
    responsive to the write command indicating the application is intolerant to data loss, send a transfer ready indicator to the host system;
    receive a write payload comprising the portion of data to be written;
    perform a hash key lookup in a hash index;
    determine whether the portion of data has previously been written to the storage system; and
    responsive to the storage system determining the portion of data has previously been written to the storage system, store a pointer to the previously written data at the write address.

4. The computer program product of claim 3, wherein the write payload comprises a number of hash keys, a size of each hash key, a plurality of hash keys including the hash key, and write data including the portion of data to be written.

5. The computer program product of claim 3, wherein determining whether the portion of data has previously been written to the storage system comprises:
    determining whether the hash key lookup results in a match;
    responsive to the hash key lookup resulting in a match, performing a bit-by-bit comparison of the portion of data and a previously stored portion of data corresponding to a matching hash in the hash index; and
    responsive to the bit-by-bit comparison resulting in a match, determining that the portion of data has previously been written to the storage system.

6. The computer program product of claim 1, wherein the computer readable program further causes the storage system to:
    notify the host system of a grain site and an identifier of a hash key calculation algorithm, wherein the host system calculates the hash key using the grain size and the identified hash key calculation algorithm.

7. The computer program product of claim 1, wherein the computer readable program further causes the storage system to:
    responsive to receiving the write command and the hash key, determine whether the portion of data has previously been written to a cache memory; and
    responsive to the storage system determining the portion of data has previously been written to the cache memory, store a pointer to the previously written data in the cache memory.

8. The computer program product of claim 4, wherein the host system uses a cache memory local to the host system to identify false positive hash key matches prior to sending the write command.

9. The computer program product of claim 1, wherein the computer readable program is stored in a computer readable storage medium in a data processing system and wherein the computer readable program was downloaded over a network from a remote data processing system.

10. The computer program product of claim 1, wherein the computer readable program is stored in a computer readable storage medium in a server data processing system and wherein the computer readable program is downloaded over a network to a remote data processing system for use in a computer readable storage medium with the remote system.

11. A storage system, comprising:
    a processor; and
    a memory coupled to the processor, wherein the memory comprises instructions which, when executed by the processor, cause the processor to:
    receive a write command and a hash key for a portion of data to be written from an application executing on a host system to a write address, wherein the write command indicates whether the application is tolerant or intolerant to data loss and wherein the hash key is calculated by the host system;
    responsive to the write command indicating the application is tolerant to data loss, perform a hash key lookup in a hash index;
    determine whether the portion of data has previously been written to the storage system; and
    responsive to the storage system determining the portion of data has previously been written to the storage system, store a pointer to the previously written data at the write address.

12. The storage system of claim 11, wherein the instructions further cause the processor to:
    responsive to the storage system determining the portion of data has not previously been written to the storage system, send a transfer ready indicator to the host system;
    receive the portion of data to be written;

site the portion of data to the storage system; and
update the hash index with the hash key.

13. The storage system of claim 11, wherein the instructions further cause the processor to:
   responsive to the write command indicating the application is intolerant to data loss, send a transfer ready indicator to the host system;
   receive a write payload comprising the portion of data to be written;
   perform a hash key lookup in a hash index;
   determine whether the portion of data has previously been written the storage system; and
   responsive to the storage system determining the portion of data has previously been written to the storage system, store a pointer to the previously written data at the write address.

14. The storage system of claim 13, wherein the write payload comprises a number of hash keys, a size of each hash key, a plurality of hash keys including the hash key, and write data including the portion of data to be written.

15. The storage system of claim 13, wherein the instructions further cause the processor to:
   determining whether the hash key lookup results in a match;
   responsive to the hash key lookup resulting in a match, performing a bit-by-bit comparison of the portion of data and a previously stored portion of data corresponding to a matching hash in the hash index; and
   responsive to the bit-by-bit comparison resulting in a match, determining that the portion of data has previously been written to the storage system.

16. The storage system of claim 11, wherein the instructions further cause the processor to:
   notify the host system of a grain size and an identifier of a hash key calculation algorithm, wherein the host system calculates the hash key using the grain size and the identified hash key calculation algorithm.

17. The storage system of claim 11, wherein the instructions further cause the processor to:
   responsive to receiving the write command and the hash key, determine whether the portion of data has previously been written to a cache memory; and
   responsive to the storage system determining the portion of data has previously been written to the cache memory, store a pointer to the previously written data in the cache memory.

18. The storage system of claim 14, wherein the host system uses a cache memory local to the host system to identify false positive hash key matches prior to sending the write command.

19. A method, in a storage system, for efficient inline data de-duplication, the method comprising:
   receiving, by the storage system, a write command and a hash key for a portion of data to be written from an application executing on a host system to a write address, wherein the write command indicates whether the application is tolerant or intolerant data loss and wherein the hash key is calculated by the host system;
   responsive to the write command indicating the application is tolerant to data loss, performing, by the storage system, a hash key lookup in a hash index;
   determining, by the storage system, whether the portion of data has previously been written to the storage system; and
   responsive to the storage system determining the portion of data has previously been written to the storage system, storing, by the storage system, a pointer to the previously written data at the write address.

20. The method of claim 19, further comprising:
   responsive to the write command indicating the application is intolerant to data loss, sending a transfer ready indicator to the host system;
   receiving a write payload comprising the portion of data to be written;
   performing a hash key lookup in a hash index;
   determining whether the portion of data has previously been written to the storage system; and
   responsive to the storage system determining the portion of data has previously been written to the storage system, storing a pointer to the previously written data at the write address.

* * * * *